United States Patent [19]

Sakamoto et al.

[11] Patent Number: 5,346,926

[45] Date of Patent: Sep. 13, 1994

[54] SMALL DIAMETER ELECTRIC WIRE INSULATED WITH HIGHLY EXPANDED CELLULAR POLYETHYLENE AND PRODUCTION THEREOF

[75] Inventors: Toshio Sakamoto; Kenichiro Kumai; Shigeru Gotoh, all of Kanagawa, Japan

[73] Assignee: Nippon Unicar Company Limited, Tokyo, Japan

[21] Appl. No.: 136,667

[22] Filed: Oct. 14, 1993

[51] Int. Cl.$^5$ ................................................ C08J 9/06
[52] U.S. Cl. ........................................ 521/81; 264/54; 521/79; 521/98; 521/134
[58] Field of Search ...................... 521/134, 98, 81, 79

[56] References Cited

PUBLICATIONS

Japanese Patent Abstract JP 58174423 of Showa Elec Wire KK.
Japanese Patent Abstract JP 54–044787 A of Mitsubishi Electric Corp.
Japanese Patent Abstract JP 04076028 A of Nippon Unicar KK.
*Encyclopedia of Polymer Science and Engineering,* Second Edition, H. Mark et al., John Wiley & Sons (1986), vol. 6, pp. 435–444.

*Primary Examiner*—Morton Foelak
*Attorney, Agent, or Firm*—B. L. Deppenbrock

[57] ABSTRACT

A process for producing an expandable resin composition for a small diameter electric wire insulated with highly expanded cellular polyethylene which comprises (1) heat-kneading at a temperature higher than 135° C. a mixture comprising: (i) a low density polyethylene having a density ranging from about 0.890 to 0.925 g/ml; (ii) a high density polyethylene having a melting point higher than 130° C.; and (iii) a polyolefin wax having an average molecular weight ranging from about 1500 to 8000 and a melting point ranging from about 100° C. to 160° C.; and (2) heat kneading at a temperature ranging from 120° C. to 130° C. and at a preliminary expansion ratio lower than 5% the mixture of step (1) with a low temperature decomposable chemical blowing agent.

7 Claims, No Drawings

SMALL DIAMETER ELECTRIC WIRE INSULATED WITH HIGHLY EXPANDED CELLULAR POLYETHYLENE AND PRODUCTION THEREOF

FIELD OF THE INVENTION

The present invention relates to an expandable resin composition for a small diameter electric wire insulated with highly-expanded cellular polyethylene and a process of making it. The small diameter electric wire insulated with highly-expanded cellular polyethylene of this invention is used for high-frequency signal transmission cable, computer cables, precision electronic instruments cables, and video image transmission cables.

BACKGROUND OF THE INVENTION

The recent trend in the technology of insulated wires, especially coaxial cables for high-frequency signal transmission, is toward the use of cellular insulating coating having a high expansion ratio for the lowering of dielectric constant and the δ, which leads to a reduction of crosstalk and attenuation, an improvement of image and sound, and a decreased number of repeaters required.

The production of wires insulated with a cellular material having a high expansion ratio resorts usually to the chemical blowing process or gas blowing process. The chemical blowing process consists of compounding a resin component with a chemical blowing agent at a temperature under the decomposition point of the chemical blowing agent, extruding the resulting compound at a temperature above the decomposition point of the chemical blowing agent, thereby coating a conductor, allowing the coating layer to expand in the air, and cooling and solidifying the expanded coating layer. The chemical blowing process is simpler in operation and more economical in equipment than the gas blowing process. Therefore, it has gained general acceptance although it is inferior to the gas blowing process as far as the expansion ratio is concerned.

A major resin used in the chemical blowing process has been high-pressure low-density polyethylene (abbreviated as HP-LDPE hereinafter). This is because HP-LDPE has no polar groups in the molecule and, hence, has a low dielectric constant, e.g. tan δ, and is suitable for use as a cellular insulation for coaxial cables. In addition, HP-LDPE has a melting point of typically about 107° C. and, hence, is capable of processing at a lower temperature than high-density polyethylene having a high melting point (typically about 133° C.). Moreover, HP-LDPE is easy to make into a highly-expanded foam because it has a higher melt tension than high-density polyethylene.

There has recently arisen a demand for the improvement of coaxial cables in characteristic properties such as dielectric constant, e.g. tan δ, for the reduction of crosstalk and attenuation. To meet this demand, it is necessary to increase the expansion ratio of the insulation coating up to 60% and above, preferably 70% or more.

However, difficulties are involved in the production of a highly-expanded (above 60%) foam from HP-LDPE. That is, the foam has such a thin cell membrane and, hence, has such a low mechanical strength that the resulting coaxial cable has poor mechanical properties such that it collapses or is broken easily during handling.

To address this problem an attempt has been made to incorporate HP-LDPE with high-density polyethylene, which is superior in mechanical strength to HP-LDPE. For example, Japanese Patent Laid-Open No. 54:44787/1979 discloses a process for producing a highly-expanded foam with high mechanical strength by gas blowing a resin composition composed of 100 parts by weight of high-density polyethylene and 20 to 50 parts by weight of low-density polyethylene. Unfortunately, this process is not applicable as such to the chemical blowing method.

Japanese Patent Laid-Open Publication No. 58:174423/1983 discloses a mixture composed of a low-density polyethylene having a melt index of 1 to 7 grams/10 minutes and a high density polyethylene. The invention is characterized by the use of two chemical blowing agents and not by the combination of two polyethylenes. In the examples, only low density polyethylene is employed and not a mixture of a low density polyethylene and a high density polyethylene.

The production of a highly-expanded foam (having an expansion ratio greater than 60%) from HP-LDPE incorporated with high-density polyethylene by the chemical blowing process requires that the resin should have a sufficiently high melt tension at its blowing temperature. For this reason, the blowing temperature is restricted in the range of 130° C. to 160° C. and, hence, the decomposition temperature of the chemical blowing agent is also restricted in the range of 130° C. to 160° C. If a chemical blowing agent having a decomposition temperature of 130° C. to 160° C. is to be uniformly dispersed into HP-LDPE incorporated with high-density polyethylene, it is necessary that mixing should be performed at a temperature higher than the melting point (typically about 133° C.) of high-density polyethylene. Such mixing, however, induces the decomposition and foaming of the chemical blowing agent, making its impossible to produce an expandable resin composition.

For the reasons mentioned above, it was difficult to produce a highly-expanded polyethylene (having an expansion ratio greater than 60%) from HP-LDPE incorporated with high density polyethylene.

The inventors found it possible to solve the above described problems by mixing low density polyethylene and high density polyethylene by a special method, and filed Japanese Patent Application Laid-Open Publication No. 4-76028/1992.

Recently, telecommunication instruments, and image or picture processing instruments, such as telephones, radios, facsimile machines, copy machines, computers, word processors, and television, have become remarkably smaller in size, and their parts have become smaller in size and have been clustered into compact configurations in high densities. To cope with this tendency, smaller-diameter electric wires insulated with highly-expanded cellular polyethylene have been increasingly used in the above mentioned instruments as compared with the conventional larger diameter wires insulated with highly-expanded cellular polyethylene, such as coaxial cables.

For the production of such larger-diameter coaxial cable, for example, the production has been conducted with no trouble by the method, such as our invention of the above-mentioned Japanese Patent Laid-Open Publication No. 4-76028, in which an expandable resin composition is applied to the larger-diameter wires. However, when the expandable resin composition disclosed in our invention of Japanese Patent -Laid-Open Publication No. 4-76028 was applied to a smaller diameter wire, the resultant cellular polyethylene did not attain an expansion ratio as high as above 60% which was required for use. This has been a problem which has been needed to be solved.

SUMMARY OF THE INVENTION

Accordingly, the present invention solves the above-mentioned problem by providing a process for producing an expandable resin composition for a small diameter electric wire insulated with a highly-expanded cellular polyethylene, said process comprising (1) heat-kneading at a temperature higher than 135° C. (i) 100 parts by weight of a low density polyethylene having a density of 0.890 to 0,925 g/ml; (ii) 1 to 110 parts by weight of a high-density polyethylene having a melting point higher than 130° C. as measured by the DSC method; and (iii) 0.3 to 5 parts by weight of a low molecular weight polyolefin wax having an average molecular weight 1500 to 8000 and a melting point of 100° C. to 160° C. as measured by the DSC method; and (2) heat-kneading at a temperature of 120° C. to 130° C., and at preliminary expansion ratio lower than 5%: (i) 100 parts by weight of the mixture obtained in (1) with (ii) 0.5 to 5 parts by weight of a low temperature decomposable chemical blowing agent i.e., at a temperature lower than the decomposition temperature of the chemical blowing agent.

DETAILED DESCRIPTION OF THE INVENTION

The term "small diameter" as used herein means that an outer diameter of an electric wire insulated with highly expanded cellular polyethylene is smaller than 2.5 mm.

The term "highly-expanded" as used herein means that the expansion ratio is greater than 60%.

The low-density polyethylene used in the present invention should be one which has a density of 0.890 g/cm$^3$ to 0.925 g/cm$^3$. It is produced by a high-pressure gas-phase process. It is non-polar, and, hence, superior in electrical properties. A preferred low-density polyethylene is one which is produced under high pressure by the aid of a radical polymerization catalyst. It should preferably have a swelling ratio higher than 55% so that it exhibits a high melt tension at the ordinary blowing temperature (130° C. to 160° C.) and changes easily into a highly-expanded foam.

The high density polyethylene used in the present invention should be one which has a melting point higher than 130° C. measured by DSC method (differential scanning calorimeter). The melting point measured by DSC method denotes the melting point which is determined by measuring the latent heat of fusion of the crystalline resin using a differential scanning calorimeter. In the following description, the melting points of high-density polyethylene are those which were measured by the DSC method. The above-specified high-density polyethylene is obtained by the homopolymerization of ethylene or copolymerization of ethylene with propylene, butene-1, pentene-1, hexene-1, octene-1, 4-methylpentene-1, or 5-methyl-hexene-1, by Phillips process that employs a chromium oxide supported catalyst, Ziegler process that employs a catalyst composed of organoaluminum (e.g., alkyl aluminum) compound and titanium halide, or gas-phase process that employs a magnesium-titanium complex catalyst. The thus obtained high-density polyethylene has a melting point of 130° C. to 137° C., a density of 0.945 g/cm$^3$ to 0.961 g/cm$^3$, and a melt index of 0.15 to 20 grams/10 minutes. Processes used to make high and low density polyethylenes are well known and taught, for example, in the *Encyclopedia of Polymer Science and Engineering*, Second Edition, H. Mark et al., John Wiley & Sons (1986), Volume 6, pages 435–444.

The low molecular weight polyolefin wax having an average molecular weight 1500 to 8000 and a melting point of 100° C. to 160° C. (measured by the DSC method) used in this invention is a wax favorably obtained by the homopolymerization or copolymerization of ethylene, propylene, butene-1, pentene-1, hexene-1, octene-1, 4-methylpentene-1 by the Ziegler process. Among them, low molecular weight polyethylene wax and low molecular weight polypropylene wax are desirable. When an average molecular weight is less than 1500, the wax oozes onto the surface of the expanded cellular polyethylene to adversely affect the electric property of the wire, and when an average molecular weight is more than 8000, the expansion ratio of the cellular polyethylene cannot attain a 60% expansion ratio, which makes the wire electric property worse.

When a melting point is less than 100° C., heat durability of the wire becomes insufficient; and when a melting point is higher than 160° C., the surface of the cellular polyethylene becomes coarse, unable to obtain the expansion ratio higher than 60%.

According to the present invention, the first step of the process consists of mixing 100 parts by weight of low-density polyethylene, 1 to 110 parts by weight of high-density polyethylene, and 0.3 to 5 parts by weight of low molecular weight polyolefin wax at an elevated temperature above 135° C. The resulting mixture has a melting point of 121° C. to 128° C., so that it can be mixed with the chemical blowing agent such as, for example, p,p'-oxybisbenzenesulfonylhydrazide (i.e., OBSH) or a mixture of OBSH and azodicarbonamide (i.e., ADCA) treated with auxiliary blowing agent or accelerator at a temperature lower than the decomposition point of the chemical blowing agent. The resulting mixture has a preliminary expansion ratio lower than 5%.

If the polyethylene mixture contains less than 1 part by weight of high-density polyethylene for 100 parts by weight of low-density polyethylene, the resulting expandable composition gives rise to a foam which lacks sufficient mechanical strength, especially hardness. If the amount of high-density polyethylene exceeds 220 parts by weight, the resulting expandable resin composition lacks sufficient melt tension at the blowing temperature (130° C. to 160° C.) and, hence, an expansion ratio higher than 60%. In addition, the mixture containing an excess amount of high-density polyethylene has a melting point higher than 128° C. and, hence, is incapable of being mixed with the chemical blowing agent at a temperature of 120° C. to 130° C.

Additionally, the object of the present invention may also be achieved by using a low-density polyethylene which has a swell ratio lower than 55% (i.e., 1.55), if the resin mixture is incorporated with the chemical blowing agent together with an organic peroxide having approximately the same decomposition temperature (for a one-minute half-life) as the chemical blowing agent.

According to the present invention, the second step of the process consists of mixing 100 parts by weight of the resin mixture with 0.5 to 5 parts by weight of the low temperature decomposable chemical blowing agent, such as OBSH or a mixture of OBSH and ADCA treated with a blowing auxiliary (OBSH:ADCA = 1:1 to 2:1). These chemical blowing agents have a lower decomposition temperature than have other chemical blowing agents. Therefore, they readily decompose at a temperature from 130° C. to 160° C. which is an adequate blowing temperature of the expandable resin composition of the present invention. Upon decomposition, they give off nitrogen for foaming. The decomposition temperature of 130° C. to 160° C. is not high enough for other chemical blowing agents such as azodicarbonamide used alone. In other words, with other chemical blowing agents, it was impossible to produce a highly expanded foam (having an expansion ratio higher than 60%) at the decomposition temperature of 130° C. to 160° C.

The amount of OBSH or a mixture of OBSH and ADCA treated with OBSH should be more than 0.5 parts by weight and less than 5 parts by weight for 100 parts by weight of the resin mixture. With an amount less than 0.5 parts by weight, the resulting expandable resin composition does not give rise to a highly expanded foam; and with an amount more than 5 parts by weight, the resulting expandable resin composition gives rise to a foam having poor electrical properties.

The mixing of OBSH a mixture of OBSH and ADCA treated with OBSH with the resin mixture should be carried out at a temperature higher than 120° C. and lower than 130° C. Mixing at a temperature lower than 120° C. does not bring about uniform dispersion of the blowing agent, with the result that the expandable resin composition expands unevenly by when it is made into a foam. On the other hand, mixing at a temperature higher than 130° C. brings about considerable decomposition of the blowing agent, resulting in premature expansion.

The auxiliary blowing agent or accelerator used in the present invention is selected from salicylic acid, stearic acid, phthalic acid, zinc stearate, lead stearate, magnesium stearate, calcium stearate, ethylene glycol, glycerin, ethanolamine, urea, urea derivative, melamine, lead phosphite (dibasic), lead sulfate (tribasic), and lead oxide. The auxiliary blowing agent should be mixed in an amount of 0.0003 to 0.5 parts by weight for 1 part by weight of ADCA at 20° C. to 120° C., preferably 30° C. to 80° C., using a V-blender, ribbon mixer, Henschel mixer or tubuler. Likewise, nucleating agents, including boron nitride, zirconium oxide, magnesium oxide (MgO), aluminum oxide ($Al_2O_3$), ADCA, talc., and the like, can be added to promote fine cell structure. Typical use level is at 0.5%, typically ranging from about 0.01-2%. Fine cell structure can also be achieved via a crosslinking mechanism such as by using a peroxide which is commonly used as a crosslinker, irradiation, and one or more silanes. HP-LDPE has more short chain branching and, thus, more tertiary hydrogen, thereby providing more crosslinking sites. The expandable resin composition of the present invention is suitable for use as the insulation coating of coaxial cables. It is fed to an extruder and extruded onto a conductor at a resin temperature of 130° C. to 160° C. to produce a coaxial cable coated with highly-expanded insulating polyethylene.

EXAMPLES

This invention will be further illustrated with reference to the following examples.

Example 1

A mixture having a melting point of 124° C. was prepared by mixing 100 parts by weight of HP-LDPE having a melt index of 2.0 g/10 min, a density of 0.917 g/cm$^3$, and a swelling ratio of 60%; 30 parts by weight of high-density polyethylene having a melt index of 3.0 g/10 min, a density of 0.960 g/cm$^3$, a swelling of 45%, and a melting point of 135° C.; 1 part by weight of polyethylene wax having an average molecular weight of 2800 and a melting point of 116° C.; and 0.2 parts by weight of butylated hydroxytoluene (antioxidant), using a Banbury mixer at 140° C. for 10 minutes.

Into 100 parts by weight of this mixture was incorporated 1.3 parts by weight of OBSH using a Banbury mixer at 127° C. for 10 minutes. The resulting mixture was formed into a sheet having a preliminary expansion ratio of 4%. This sheet was cut into pellets, each measuring 3 millimeters (mm) thick, 5 mm long, and 4 mm wide.

The pellets were extruded from a 50-mm extruder (L/D=24), with the cylinder temperatures of the feeding zone, compression zone, and metering zone controlled at 130° C., 140° C., and 147° C., respectively, so as to coat a copper conductor (0.38 mmΦ in diameter, Φ0.127×7 twist) preheated to 50° C. The coated wire was taken up at a rate of 300 m/min. Thus there was obtained a foam-insulated coaxial cable core having an outside diameter of 0.7 mm.

It was found that the foam has an expansion ratio of 63.0% and a cell diameter of 50 to 100 μm.

Comparative Example 1

The same procedure as in Example 1 was repeated except that the polyethylene wax was not used. The resulting foam was found to have an expansion ratio of 42.1%.

Example 2

A mixture having a melting point of 126° C. was prepared by mixing 100 parts by weight of HP-LDPE having a melt index of 3.0 g/10 min, a density of 0.918 g/cm$^3$, and a swelling ratio of 63%, 100 parts by weight of high-density ethylene-butene-1 copolymer having a melt index of 5.0 g/10 min, a density of 0.950 g/cm$^3$, a swelling ratio of 50%, and a melting point of 131° C.; 0.7 parts by weight of polypropylene wax having an average molecular weight of 4500 and a melting point of 150° C.; and 0.2 parts by weight of butylated hydroxytoluene (antioxidant), using a Banbury mixer at 156° C. for 10 minutes.

Into 100 parts by weight of this mixture was incorporated 4 parts by weight of OBSH using a Banbury mixer at 129° C. for 10 minutes. The resulting mixture was formed into a sheet having a preliminary expansion ratio of 5%. This sheet was cut into pellets, each measuring 3 mm thick, 5 mm long, and 4 mm wide.

The pellets were extruded from a 50-mm extruder (L/D=24), with the cylinder temperatures of the feeding zone, compression zone, and metering zones controlled at 135° C., 142° C. and 149° C., respectively, so as to coat a copper conductor (0.38 mmΦ in diameter, Φ0.127×7 twist) preheated to 50° C. The coated wire was taken up at a rate of 300 m/min. Thus there was obtained a foam-insulated coaxial cable core having an outside diameter of 0.7 mm.

It was found that the foam has an expansion ratio of 63.6% and a cell diameter of 50 to 100 μm.

Comparative Example 2

The same procedure as in Example 2 was repeated except that polypropylene wax was not used. The resulting foam was found to have an expansion ratio of 38.7%.

Example 3

A mixture having a melting point of 124° C. was prepared by mixing 100 parts by weight of HP-LDPE having a melt index of 2.0 g/10 min, a density of 0.920 g/cm³, and a swelling ratio of 54%, 100 parts by weight of high-density polyethylene having a melt index of 7.0 g/10 min, a density of 0.959 g/cm³, a swelling ratio of 53%, and a melting point of 133° C.; 4 parts by weight of polyethylene wax having an average molecular weight 7000 and melting point of 123° C.; and 0.2 parts by weight of butylated hydroxytoluene (antioxidant-),using a Banbury mixer at 140° C. for 10 minutes.

Into 100 parts by weight of this mixture was incorporated 3.5 parts by weight of OBSH and 200 ppm of 1, 1-bis-(t-butylperoxy)-3,3,5-trimethylcyclohexane (having a one minute half-life temperature of 148° C.) using a Banbury mixer at 128° C. for 10 minutes. The resulting mixture was formed into a sheet having a preliminary expansion ratio of 4.5%. This sheet was cut into pellets, each measuring 3 mm thick, 5 mm long, and 4 mm wide.

The pellets were extruded from a 50-mm extruder (L/D=24), with the cylinder temperatures of the feeding zones, compression zone, and metering zone controlled at 135° C., 140° C. and 148° C., respectively, so as to coat a copper conductor (0.38 mmΦ in diameter, Φ0.127×7 twist) preheated to 50° C. The coated wire was taken up at a rate of 20 m/min. Thus there was obtained a foam-insulated coaxial cable core having an outside diameter of 0.7 mm.

It was found that the foam has an expansion ratio of 63.5% and a cell diameter of 50 to 100 μm.

Example 4

A mixture having a melting point of 126° C. was prepared by 100 parts by weight of HP-LDPE having a melt index of 3.0 g/10 min, a density of 0.918 g/cm³ and a swelling ratio of 60%; 20 parts by weight of high-density polyethylene having a melt index 3.5 g/10 min, density of 0.960 g/cm³, a swelling ratio of 48% and a melting point of 135° C.; 4.5 parts by weight of polypropylene wax having an average molecular weight of 2000, a melting point of 158° C.; and 0.2 parts by weight of butylated hydroxytoluene (antioxidant), using a Banbury mixer at 165° C. for 10 minutes.

Into 100 parts by weight of this mixture was incorporated 3 parts by weight of OBSH; 2 parts by weight of ADCA treated with 0.5 parts by weight of urea; and 300 ppm of 1,1-bis-(t-butylperoxy)cyclododecane (having a one-minute half-life temperature of 153° C.) using a Banbury mixer at 129° C. for 10 minutes. The resulting mixture was formed into a sheet having a preliminary expansion ratio of 4.9%. This sheet was cut into pellets, each measuring 3 mm thick, 5 mm long and 4 mm wide.

The pellets were extruded from a 50-mm extruder (L/D=24), with the cylinder temperatures of the feeding zone, compression zone, and metering zone controlled at 135° C., 142° C. and 155° C., respectively, so as to coat a copper conductor (0.38 mmΦ in diameter, Φ0.127×7 twist) preheated to 50° C. The coated wire was taken up at a rate of 20 m/min. Thus there was obtained a foam-insulated coaxial cable core having an outside diameter of 0.7 mm.

It was found that the foam has an expansion ratio of 61.7% and a cell diameter of 40 to 80 μm.

What is claimed is:

1. A process for producing an expandable resin composition for a small diameter electric wire insulated with a highly-expanded cellular polyethylene, said process comprising:
   (1) heat-kneading at a temperature higher than 135° C.
      (i) 100 parts by weight of a low density polyethylene having a density of 0.890 to 0.925 g/ml;
      (ii) 1 to 110 parts by weight of a high-density polyethylene having a melting point higher than 130° C.; and
      (iii) 0.3 to 5 parts by weight of a low molecular weight polyolefin wax having an average molecular weight 1500 to 8000 and a melting point of 100° C. to 160° C.; and
   (2) heat-kneading at a temperature of 120° C. to 130° C. and at preliminary expansion ratio lower than 5%:
      (i) 100 parts by weight of the mixture obtained in (1) with;
      (ii) 0.5 to 5 parts by weight of a low temperature decomposable chemical blowing agent.

2. A process for producing an expandable resin composition according to claim 1, wherein a low molecular weight polyolefin wax is a low molecular weight polyethylene wax or a low molecular weight polypropylene wax.

3. A process for producing an expandable resin composition according to claim 2, wherein a low temperature decomposable chemical blowing agent is a p,p'-oxybisbenzenesulfonylhydrazide and azo-dicarbonamide treated with a blowing auxiliary in a mixing ratio of 1:1 to 2:1.

4. An expandable resin composition for highly-expanded insulating polyethylene prepared according to claim 1.

5. A production method for a small diameter electric wire insulated with highly-expanded cellular polyethylene characterized by extrusion covering a wire with an expandable resin composition as according to claim 4 at a temperature 130° C. to 160° C.

6. A small diameter electric wire insulated with highly expanded cellular polyethylene produced by the method of claim 5.

7. A composition comprising:
   (A) 100 parts by weight of a mixture comprising;
      (i) 100 parts by weight of a low density polyethylene having a density of 0.890 to 0.925 g/ml,
      (ii) 1 to 110 parts by weight of a high-density polyethylene having a melting point higher than 130° C.; and
      (iii) 0.3 to 5 parts by weight of a low molecular weight polyolefin wax having an average molecular weight of 1500 to 8000 and a melting point of 100° C. to 160° C.; and
   (B) 0.5 to 5 parts by weight of a low temperature decomposable chemical blowing agent.

* * * * *